United States Patent
Kaganoi

Patent Number: 6,108,747
Date of Patent: Aug. 22, 2000

[54] METHOD AND APPARATUS FOR CYCLICALLY SEARCHING A CONTENTS ADDRESSABLE MEMORY ARRAY

[75] Inventor: Teruo Kaganoi, Tokyo, Japan

[73] Assignee: NEC Corporation, Tokyo, Japan

[21] Appl. No.: 09/060,982

[22] Filed: Apr. 15, 1998

[30] Foreign Application Priority Data

Apr. 16, 1997 [JP] Japan ................................ 9-099065

[51] Int. Cl.[7] ................................................ G06F 12/00
[52] U.S. Cl. ...................... 711/108; 364/715.1; 341/160; 365/49
[58] Field of Search .............................. 711/108; 365/49; 364/715.1; 341/160

[56] References Cited

U.S. PATENT DOCUMENTS

| | | | |
|---|---|---|---|
| 4,887,084 | 12/1989 | Yamaguchi | 341/160 |
| 5,123,105 | 6/1992 | Wyland et al. | 710/244 |
| 5,321,640 | 6/1994 | Anderson et al. | 708/211 |
| 5,455,576 | 10/1995 | Clark, II et al. | 341/50 |
| 5,555,397 | 9/1996 | Sasama et al. | 711/158 |
| 5,953,315 | 9/1999 | Kaganoi | 370/230 |

FOREIGN PATENT DOCUMENTS

| | | |
|---|---|---|
| 5-189979 | 7/1993 | Japan . |
| 9-139741 | 5/1997 | Japan . |

*Primary Examiner*—Do Hyun Yoo
*Assistant Examiner*—Mehdi Namazi
*Attorney, Agent, or Firm*—Scully, Scott, Murphy & Presser

[57] ABSTRACT

To provide a method of searching a CAM which enables to search an address of matching contents cyclically recorded in a memory array of the CAM with a priority at once, the method of searching a CAM array (2) having first address lines (20), whereof certain are made active when the CAM array (2) is searched with a search key, comprises steps of: obtaining restricted search results by making address lines of the first address lines (20) having addresses lower than a restriction address inactive; selecting logic of third address lines (70) from logic of the restricted search results when any of the restricted search results is active, and from logic of the first address lines (20) as it is, when none of the restricted search results is active; and outputting a searched address by encoding a lowest active address line of the third address lines (70).

6 Claims, 3 Drawing Sheets

METHOD AND APPARATUS FOR CYCLICALLY SEARCHING A CONTENTS ADDRESSABLE MEMORY ARRAY

BACKGROUND OF THE INVENTION

The present invention relates to a method of and an apparatus for searching a Contents Addressable Memory (hereafter abbreviated as the CAM) which can be accessed with its contents, that is, memorized data, as a search key.

In the CAM, data memorized therein can be accessed with contents of the data themselves, while, in ordinary memory devices, memorized data are simply to be accessed with their addresses. That is, when a bit sequence of a word length, whereof some bits may be masked, is given as a search key to the CAM in a search mode, the CAM outputs an address thereof by encoding an address line, namely, a word line of its memory cell array wherein the same or matching bit sequence is recorded.

Therefore, by memorizing communication log data in the CAM at addresses associated with their time stamps, for example, a time stamp of a specific communication log can be searched by accessing the CAM with a bit sequence corresponding to log data to be searched.

There may be more than one address line, however, wherein the same data are recorded in the CAM array. Hence, there is usually provided a priority address encoder in the CAM, which outputs a searched address by encoding an address line selected with a certain priority, that is, a lowest address line or a highest address line among address lines of the CAM array which are made active by the search key.

Further, in some CAM devices, there is provided a priority restriction circuit for restricting an effective address range of the address lines to be encoded with the priority by designating a restriction address, so that the priority encoder outputs an address of the lowest address line not lower than the restriction address, or an address of the highest address line not higher than the restriction address, among the address lines made active by the search key.

An example of a CAM provided with such a searching apparatus having the priority encoder and the priority restriction circuit is described by the present inventor in a Japanese patent application entitled "ATM Cell Transfer System" (hereafter called the first prior art), laid open as a Provisional Publication No. 139741/97. In the ATM cell transfer system, by associating addresses of the CAM with timings, address data of received ATM cells stored in a buffer memory are registered in lowest available addresses (corresponding to earliest timings) of the CAM searched with a search key for searching available addresses with the restriction addresses associated with timings (that is, after the timings) at which the received ATM cells are ideally to be transmitted. Such operation enables a prompt and simple re-timing of ATM cells to be transferred.

In another Japanese patent application laid open as a Provisional Publication No. 189979/93 (to be called the second prior art), a different type of the searching apparatus is disclosed, wherein an addresses of a CAM having the matching data are output sequentially one by one with a priority.

However, there are cases wherein a CAM having a limited memory space is desired to be used cyclically.

For example, there may be a case where specific log data earliest after 22 o'clock of the previous date are desired to be searched from communication log data daily recorded at every second in a CAM such that 60×60×24 addresses are associated to every second of one day. In this case, designating a restriction address corresponding to 22 o'clock, the CAM is searched with a bit sequence corresponding to the specific log data. However, when there is no matching log data found after the restriction address until the highest address, that is, from 22 o'clock to 24 o'clock, the CAM should be searched once more, resetting the restriction address to the lowest address representing 0 o'clock of the present day, as prior art.

It is the same in the second prior art.

SUMMARY OF THE INVENTION

Therefore, a primary object of the present invention is to provide a method and apparatus for searching a CAM which, provides an ability to search all address of matching contents cyclically recorded in a memory array of the CAM with a priority at once. That is, the present invention searches a lowest address line indicating matching contents among whole address lines of the memory cell array when there is no address line indicating matching contents among address lines not lower than a designated restriction address, and a lowest address line indicating matching contents, when there is any, among address lines not lower than tire restriction address, or a highest address line indicating matching contents among whole address lines of tire memory cell array when there is no address line indicating matching contents among address lines not higher than a restriction address, and a highest address line indicating matching contents, if there is any, among address lines not higher than the restriction address.

In order to achieve tire object, the method of the invention of searching a CAM array having a plurality of first address lines whereof certain are made active when the CAM array is searched with at search key comprises steps of:

obtaining restricted search results by inactivating address lines of the plurality of first address lines having addresses lower than a restriction address;

selecting logic of second address lines from logic of the restricted search results when any of the restricted search results is active, and from logic of the plurality of the first address lines as it is, when none of the restricted search results is active; and outputting a searched address by encoding an active address line having lowest address among the second address lines.

Therefore, an address of matching contents cyclically recorded in the CAM array call be searched with a priority at once, that is, a lowest address line indicating matching contents among whole address lines of the CAM array when there is no address line indicating matching contents among address lines not lower than a designated restriction address, and a lowest address line indicating matching contents, when there is any, among address lines not lower than the restriction address.

When a highest address is desired to be searched cyclically, the method of the invention comprises steps of:

obtaining restricted search results by inactivating address lines of the plurality of first address lines having addresses higher than a restriction address;

selecting logic of second address lines from logic of the restricted search results when any of the restricted search results is active, and from logic of the plurality of the first address lines as it is, when none of the restricted search results is active; and outputting a searched address by encoding an active address line having highest address among the second address lines.

Therefore, an address of matching contents cyclically recorded in the CAM array call be searched also with another priority at once, that is, a highest address line indicating matching contents among whole address lines of the CAM array when there is no address line indicating matching contents among address lines not higher than a designated restriction address, and a highest address line indicating matching contents, when there is any, among address lines not higher than the restriction address.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
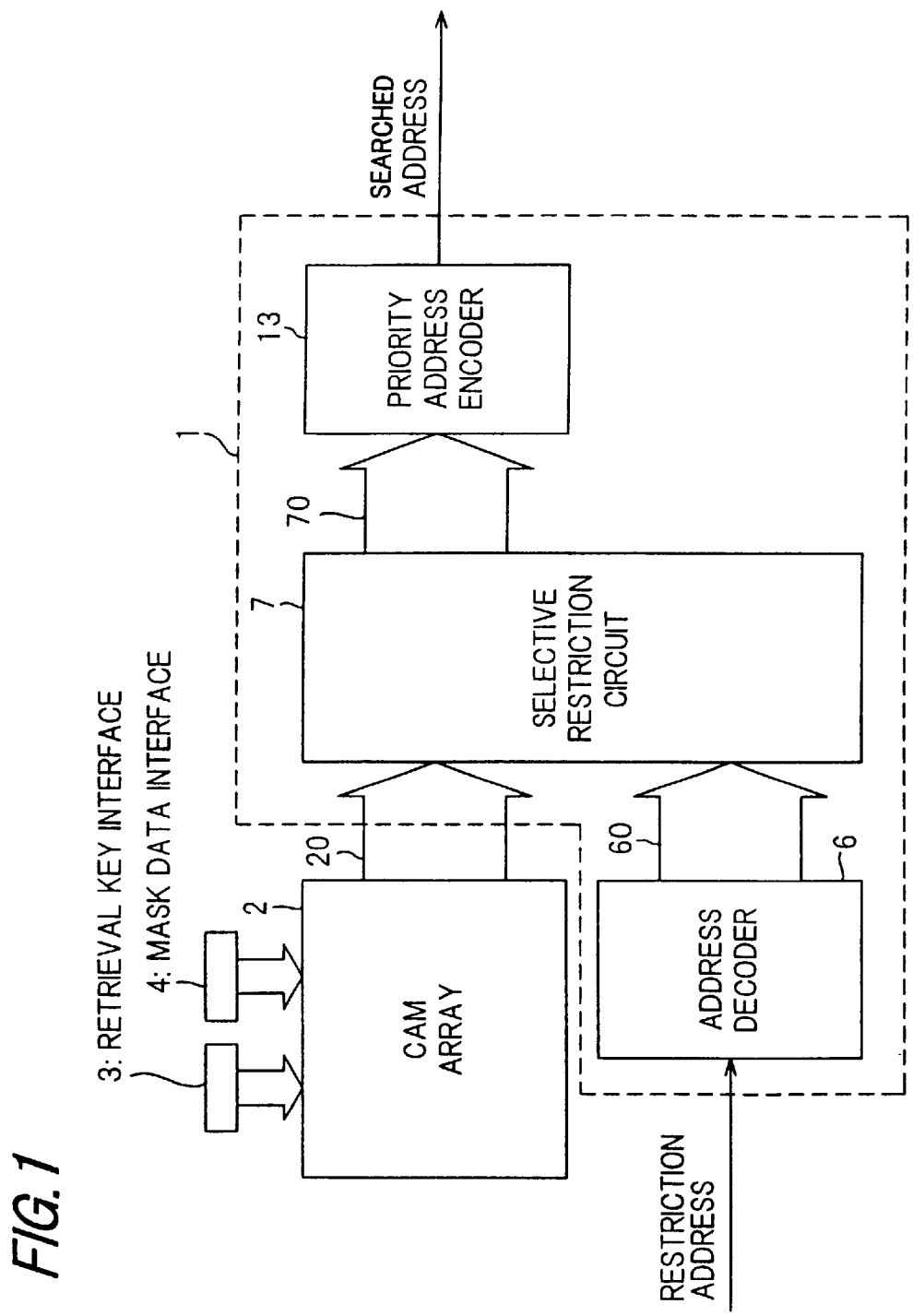
FIG. 1 is a block diagram of a CAM provided with a searching apparatus 1 according to an embodiment of the invention.

FIG. 1 is a block diagram of a CAM provided with a searching apparatus 1 according to an embodiment of the invention for obtaining a searched address by encoding one of first address lines 20 made active of a CAM array 2.

The CAM array 2 is provided with a search key interface 3 where a search key is input and a mask data interface 4 where mask data are input, and activates each of the first address lines 20 connected to memory cells storing contents whereof logic of bits unmasked by the mask data match with logic of corresponding bits of the search key.

The searching apparatus 1 comprises;

an address decoder 6 for making one of second address lines 60 active by decoding a restriction address supplied thereto, the second address lines 60 having the same number with the first, address lines 20, a selective restriction circuit 7 for restricting effective range of the first address lines 20 selectively, such as will be described afterwards, according to logic of the first address lines 20 and logic of the second address lines 60, and making active some of third address lines 70 according to logic of an effective range of the first address lines 20, and an priority address encoder 13 for outputting a searched address by encoding an active one of the third address lines 70 with a priority.

As to the address decoder 6, any appropriate conventional address decoder, such as a row address decoder of an ordinary memory cell array for making one of word lines active by decoding a row address, may be applied, and detailed descriptions are omitted, here.

As to the priority address encoder 13, any appropriate conventional priority address encoder may be applied, and detailed descriptions are also omitted. When a lowest, address is desired to be searched cyclically, a priority address encoder for encoding a lowest active, address line is applied to the priority address encoder 13, and a priority address encoder for encoding a highest active address line is applied to the priority address encoder 13 when a highest, address is desired to be searched cyclically.

In the following paragraphs, details of the selective restriction circuit 7 will be described.

Figure 2:
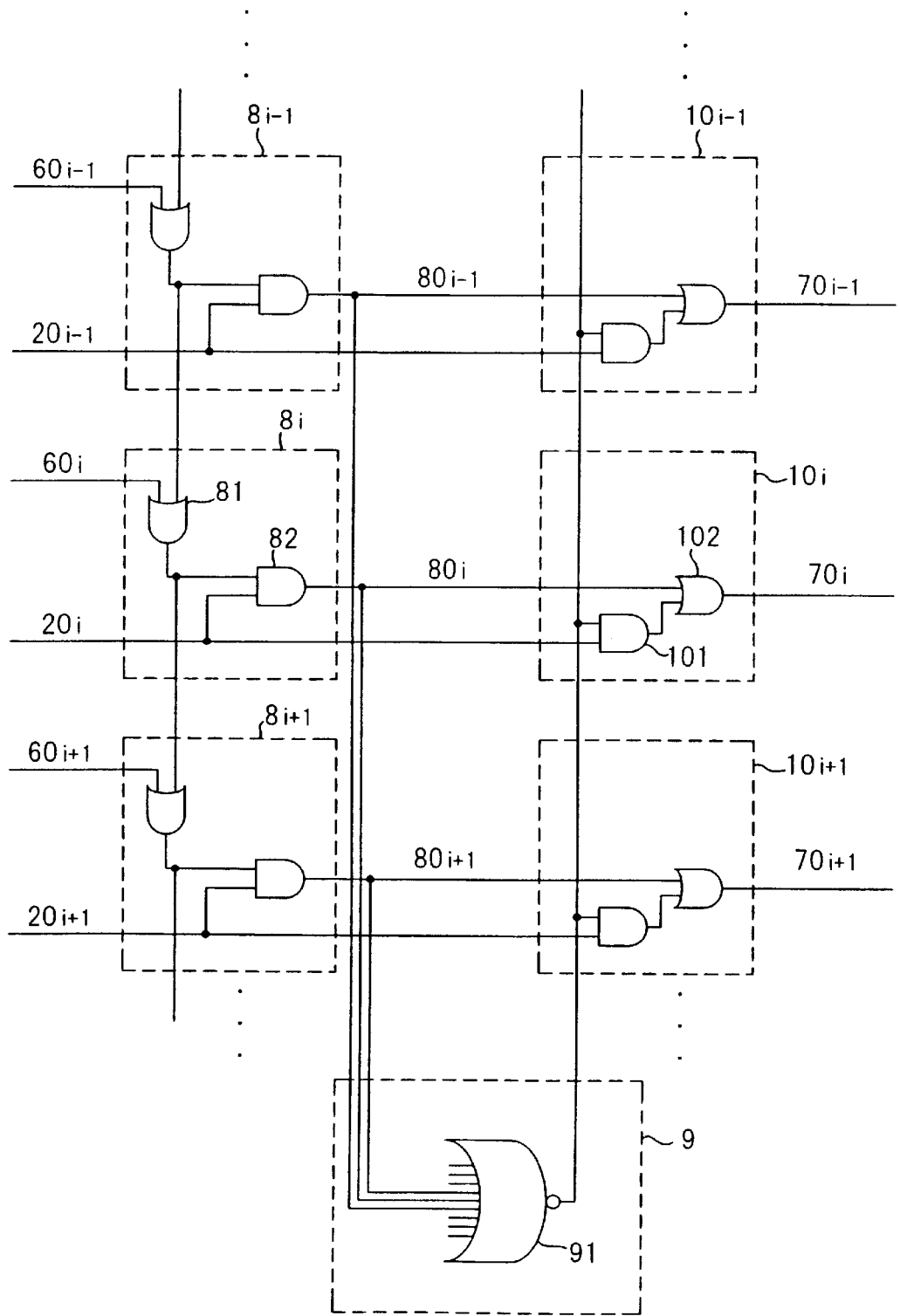
FIG. 2 is a block diagram illustrating an example of the selective restriction circuit 7 of FIG. 1.

FIG. 2 is a block diagram illustrating an example of the selective restriction circuit 7 which is applied to the searching apparatus 1 wherein a lowest address is desired to be searched cyclically, by way of example, used in combination with a priority address encoder 13 for encoding a lowest active address line.

Referring to FIG. 2, the selective restriction circuit 7 comprises;

a cascade connection of priority restriction circuits $8_i$ (i=1 to n), each corresponding to each of a plurality (n) of the first address lines $20_i$, for obtaining restricted search results $80_i$ according to logic of the second address lines $60_i$, a check circuit 9 for checking logic of the restricted search results $80_i$, and a cascade connection of selection circuits $10_i$ for selecting logic to be output to the third address lines $70_i$ from logic of either of the first address lines $20_i$ or the restricted search results $80_i$ according to output, of the check circuit 9.

The first, the second and the third address lines $20_i$, $60_i$, and $70_i$ correspond to those 20, 60 and 70 of FIG. 1.

Each of the priority restriction circuits, a priority restriction circuit $8_i$, for example, has an OR, gate (81 except for first priority restriction circuit $8_1$) for obtaining OR logic of an i-th second address line $60_i$ and output of the OR gate 81 of the lower priority restriction circuit $8_{i-1}$, and an AND gate 82 for obtaining AND logic of i-th first address line $20_i$ and output of the OR gate 81 (or logic of a first, $60_1$ of the second address lines in the first priority restriction circuit $8_1$).

The check circuit 9 has a multi-input NOR gate 91 for obtaining NOR logic of all of the restricted search results $80_i$.

Each of the selection circuits, a selection circuit $10_i$, for example, has an AND gate 101 for obtaining AND logic of an i-th first address line $20_i$ and output of the NOR gate 91, and an OR gate 102 for obtaining OR logic of an i-th search result $80_i$ and output of the AND gate 101.

Now, operation of the selective restriction circuit is described referring to FIGS. 1 and 2.

A restriction address i, for example, supplied to the address decoder 6 is decoded and a corresponding one of the second address lines 60, a i-th second address line $60_i$, becomes active. Hence, output of the OR gate 81 becomes active in the priority restriction circuits $8_i$ to $8_n$, while it remains inactive in the priority restriction circuits $8_1$ to $8_{i-1}$. Therefore, the output of the AND gate 82 remains inactive in the priority restriction circuits $8_1$ to $8_{i-1}$ regardless of logic of the first address line $20_1$ to $20_{i-1}$, while it becomes the same with first address line $20_i$ in the priority restriction circuits $8_i$ to $8_n$.

Thus, the restricted search results $80_1$ to $80_n$, are obtained from the AND gate 82 of the priority restriction circuits $8_1$ to $8_n$, by masking search results of the first address lines $20_1$ to $20_{i-1}$ whereof addresses are lower than the search restriction address i.

When there is any which is active among the restricted search results $80_i$ to $8_n$, output of the NOR, gate 91 becomes inactive. Hence, output of the AND gate 101 of every selection circuit $10_1$ to $10_n$ remains inactive regardless of logic of the first, address lines $20_1$ to $20_n$. Therefore, logic of the restricted search results $80_1$ to $80_n$ are output; to the third address lines $70_1$ to $70_n$, respectively, as they are.

On the other hand, when every of the restricted search results $80_1$ to $80_n$ is inactive, that is, 110 search result is found from the restriction address to the maximum address, output of the NOR gate 91 becomes active. Hence, output of the AND gate 101 of every selection circuit $10_1$ to $10_n$ becomes the same with logic of the first address lines $20_1$ to $20_n$. Therefore, logic of the first address lines $20_1$ to $20_n$ is output to the third address lines $70_1$ to $70_n$, respectively, as they are.

The third address lines 70 ($70_1$ to $70_n$) are encoded by the priority address encoder 13 and an address of the lowest active one of the third address lines 70 is output as the searched address.

Thus, the searching apparatus 1 of the embodiment provides the ability to search an address of matching contents cyclically recorded in the CAM array 2 with a priority at once, that is, a lowest address line indicating matching contents among whole address lines of the CAM array 2 when there is no address line indicating matching contents among address lines not lower than a designated restriction address, and a lowest address line indicating matching contents, when there is any, among address lines not lower than the restriction address.

Figure 3:
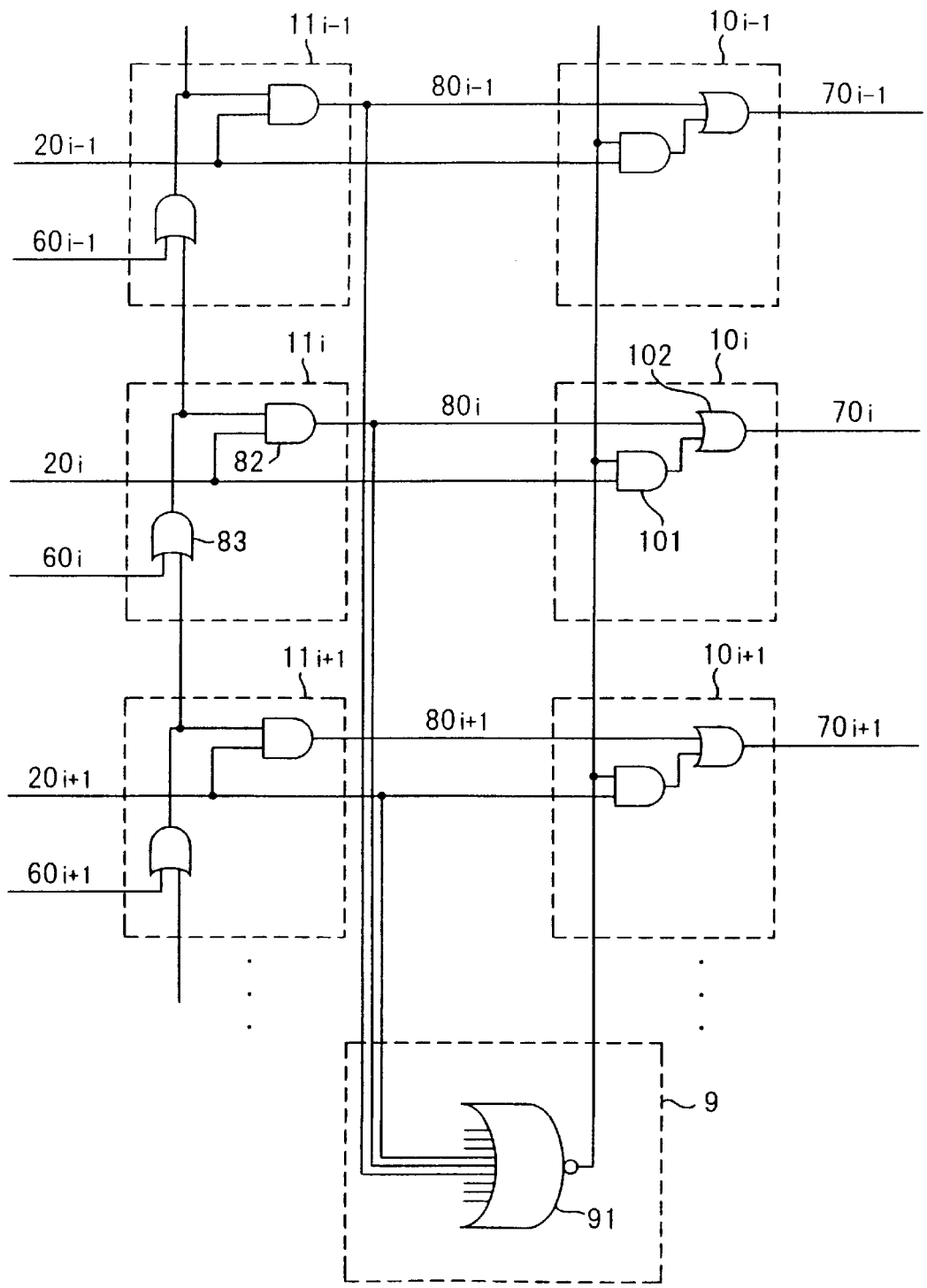
FIG. 3 is a block diagram illustrating another example of the selective restriction circuit 7 of FIG. 1.

FIG. 3 is a block diagram in illustrating another example of the selective restriction circuit 7 of FIG. 1 which, is applied to the searching apparatus 1 wherein a highest address is desired to be searched cyclically, in combination with a priority address encoder 13 which encodes a highest active one of the third address lines 70.

The selective restriction circuit 7 of FIG. 3 has a similar configuration to the selective restriction circuit 7 of FIG. 2 except for comprising a cascade connection of priority restriction circuits $11_i$ (i=1, to n), in place of the priority restriction circuits $8_i$ of FIG. 2.

Each of the priority restriction circuits, a priority restriction circuit $11_i$, for example, has an OR gate 83 (except for n-th priority restriction circuit $11_{i+1}$,) for obtaining OR logic of i-th second address line $60_i$ and output of the OR, gate 83 of the upper priority restriction circuit $11_{i+1}$, and an AND gate 82 for obtaining AND logic of i-th first address line $20_i$ and output of the OR gate, 83 (or logic of the n-th second address line $60_n$ itself in the n-th priority restriction circuit 11n).

Therefore, by designating a restriction address i, the restricted search results $80_1$ to $80_n$ are obtained from the AND gate 82 of the priority restriction circuits $11_1$ to $11_n$ by masking search results of the first address lines $20_{i+}$ to $20_n$ whereof addresses are higher than the search restriction address i, in the similar way with the priority restriction circuit $8_1$ to $8_n$ of FIG. 2.

The check circuit 9 checks logic of the restricted search results $80_1$ to $80_n$, and the selection circuits $10_1$ to $10_n$ selects logic to be output to the third address lines 70 from logic of either of the first address lines 20 or the restricted search results $8_1$ to $80_n$ according to output of the check circuit 9, in the same way with the check circuit 9 and the selection circuits $10_1$ to $10_n$ of FIG. 2.

The third address lines 70 are encoded by the priority address encoder 13 and an address of the highest active one of the third address lines 70 is output as the searched address.

Thus, the searching apparatus 1 of this embodiment provides an ability to search an address of matching contents cyclically recorded in the CAM array 2 with a priority at once, that is, a highest address line indicating matching contents among whole address lines of the CAM array 2 when there is no address line indicating matching contents among address lines not higher than a designated restriction address, and at highest address line indicating matching contents, when there is any, among address lines not higher than the restriction address.

What is claimed is:

1. A method of searching a CAM (Contents Addressable Memory) array having a plurality of first address lines whereof certain of said first address lines are made active when the CAM array is searched with a search key; said method comprising steps of:

obtaining restricted search results by inactivating address lines of the plurality of first address lines having addresses lower than a restriction address; and selecting logic of second address lines from logic of the restricted search results when any of the restricted search results are active, and from logic of an entirety of the plurality of the first address lines when none of the restricted search results are active; and outputting a searched address by encoding an active address line having a lowest address among the second address lines, such that addresses of matching contents cyclically recorded in the CAM array are searched at once.

2. A method of searching a CAM (Contents Addressable Memory) array having a plurality of first address lines whereof certain of said first address lines are made active when the CAM array is searched with a search key; said method comprising steps of:

obtaining restricted search results by inactively address lines of the plurality of first address lines having addresses higher than a restricted address;

selecting logic of second address lines from logic of the restricted search results when any of the restricted search results are active, and from logic of an entirety of the plurality of the first address lines when none of the restricted search results are active; and outputting a searched address by encoding an active address line having a highest address among the second address lines, such that addresses of matching contents cyclically recorded in the CAM array are searched at once.

3. An apparatus for searching a CAM (Contents Addressable Memory) array having a plurality of first address lines whereof certain of said first address lines are made active when the CAM array is searched with a search key; said apparatus comprising:

an address decoder for activating one of second address lines according to a restriction address, each of the second address lines corresponding to each of the plurality of first address lines of the CAM array;

a selective restriction circuit for obtaining restricted search results by inactivating address lines of the plurality of first address lines having addresses higher than a restriction address according to logic of the second address lines, and selecting logic of third address lines from logic of the restricted search results when any of the restricted search results are active, and from logic of an entirety of the plurality of the first address lines when none of the restricted search results are active; and an priority address encoder for outputting a searched address by encoding an active address line having a lowest address among the third address lines, wherein addresses of matching contents cyclically recorded in the CAM array are searched at once.

4. An apparatus as recited in claim 3; said selective restriction circuit further comprising:

a cascade connection of priority restriction circuits each corresponding to each of the plurality (n: n being a positive integer) of first address lines, a first of the priority restriction circuits having an AND gate for obtaining a first of the restricted search results having AND logic of a first of the plurality of the first address lines and a first of the second address lines, and each i-th (i being an integer from 2 to n) of the priority restriction circuits having an OR gate for obtaining a restriction signal having OR logic of a corresponding i-th of the second address lines and the restriction signal of an (i-1)-th of the priority restriction circuits, and an AND gate for obtaining an i-th of the restricted search results having AND logic of a corresponding i-th of the plurality of the first address lines and the restriction signal;

a NOR gate for obtaining a selection signal having NOR logic of each of the restricted search results; and a cascade connection of selection circuits, wherein each i-th (i being an integer from 1 to n) of the selection circuits has an AND gate for obtaining AND logic of the selection signal and the corresponding i-th of the plurality of the first address lines, and an OR gate for outputting OR logic of the output of the AND gate and the corresponding i-th of the restricted searched results as logic of a corresponding i-th of the third address lines.

5. An apparatus for searching a CAM (Contents Addressable Memory) array having a plurality of first address lines whereof certain of said first address lines are made active when the CAM array is searched with a search key; said apparatus comprising:

an address decoder for activating one of second address lines according to a restriction address, each of the second address lines corresponding to each of the plurality of first address lines of the CAM array;

a selective restriction circuit for obtaining restricted search results by inactivating address lines of the plurality of first address lines having addresses lower than a restriction address according to logic of the second address lines, and selecting logic of third address lines from logic of the restricted search results when any of the restricted search results are active, and from logic of an entirety of the plurality of the first address lines when none of the restricted search results are active; and a priority address encoder for outputting a searched address by encoding an active address line having a lowest address among the third address lines, wherein an addresses of matching contents cyclically recorded in the CAM array are searched at once.

6. An apparatus as recited in claim 5; said selective restriction circuit further comprising:

a cascade connection of priority restriction circuits each corresponding to each of the plurality (n: n being a positive integer) of first address lines, each i-th (i being an integer from 1 to n-1) of the priority restriction circuits having an OR gate for obtaining a restriction signal having OR logic of a corresponding i-th of the second address lines and the restriction signal of an (i+1)-th of the priority restriction circuits, and an AND gate for obtaining an i-th of the restricted search results having AND logic of a corresponding i-th of the plurality of the first address lines and the restriction signal, and an n-th of the priority restriction circuit having an AND gate for obtaining an n-th of the restricted search results having AND logic of an n-th of the plurality of the first address lines and an n-th of the second address lines;

a NOR gate for obtaining a selection signal having NOR logic of each of the restricted search results; and a cascade connection of selection circuits, wherein each i-th (i being an integer from 1 to n) of the selection circuits has an AND gate for obtaining AND logic of the selection signal and the corresponding i-th of the plurality of the first address lines, and an OR gate for outputting OR logic of the output of the AND gate and the corresponding i-th of the restricted searched results as logic of a corresponding i-th of the third address lines.

* * * * *

UNITED STATES PATENT AND TRADEMARK OFFICE
CERTIFICATE OF CORRECTION

PATENT NO.   : 6,108,747
DATED        : August 22, 2000
INVENTOR(S)  : T. Kaganoi It is certified that error appears in the above-identified patent and that said Letters Patent is hereby corrected as shown below:

Column 1,
Line 59, "an" should read -- all --

Column 2,
Line 10, "as prior art" should read -- as in the first prior --
Line 15, "all" should read -- an --
Line 31, "tire" should read -- the --
Line 47, "call" should read -- can --

Column 3,
Line 2, "call" should read -- can --

Column 5,
Line 4, "110" should read -- no --
Line 39, "11i+1,) should read -- 11n) --

Signed and Sealed this

Eighth Day of January, 2002

Attest:

JAMES E. ROGAN
Attesting Officer   Director of the United States Patent and Trademark Office